United States Patent
Crisan (10) Patent No.: US 8,990,122 B2
(45) Date of Patent: Mar. 24, 2015

(54) METHOD AND SYSTEM FOR PROVIDING COMPUTER APPLICATION SUPPORT

(75) Inventor: Adrian Crisan, San Diego, CA (US)

(73) Assignee: Sony Corporation, Tokyo (JP)

(*) Notice: Subject to any disclaimer, the term of this patent is extended or adjusted under 35 U.S.C. 154(b) by 817 days.

(21) Appl. No.: 12/725,374

(22) Filed: Mar. 16, 2010

(65) Prior Publication Data

US 2011/0231288 A1    Sep. 22, 2011

(51) Int. Cl.
| | |
|---|---|
| *G06Q 30/00* | (2012.01) |
| *G06Q 10/10* | (2012.01) |
| *G06Q 30/02* | (2012.01) |
| *G06F 9/445* | (2006.01) |
| *G06Q 30/06* | (2012.01) |
| *G06Q 50/00* | (2012.01) |
| *G06F 9/44* | (2006.01) |

(52) U.S. Cl.
CPC ............ *G06Q 10/10* (2013.01); *G06Q 30/0282* (2013.01); *G06F 8/61* (2013.01); *G06F 9/4446* (2013.01); *G06Q 30/016* (2013.01); *G06Q 30/0641* (2013.01); *G06Q 50/00* (2013.01); *G06Q 50/01* (2013.01)
USPC .......................... 705/319; 705/347; 705/26.1

(58) Field of Classification Search
CPC .............. G06Q 50/01; G06Q 30/0282; G06Q 30/0601; G06Q 30/0604; G06Q 30/0603
USPC ................................ 705/26.1, 27.1, 319, 347
See application file for complete search history.

(56) References Cited

U.S. PATENT DOCUMENTS

| | | | | |
|---|---|---|---|---|
| 7,237,240 | B1* | 6/2007 | Chen et al. .................... | 718/100 |
| 7,503,042 | B2* | 3/2009 | Henrickson et al. .......... | 717/175 |
| 7,730,480 | B2* | 6/2010 | Isaacson ....................... | 717/174 |
| 8,387,038 | B2* | 2/2013 | Wheeler et al. ............... | 717/174 |
| 8,490,087 | B2* | 7/2013 | Beaty et al. ....................... | 718/1 |
| 2001/0051982 | A1 | 12/2001 | Graziani | |
| 2002/0156877 | A1* | 10/2002 | Lu et al. ........................ | 709/221 |
| 2003/0172373 | A1* | 9/2003 | Henrickson et al. .......... | 717/175 |
| 2003/0200274 | A1* | 10/2003 | Henrickson et al. .......... | 709/212 |
| 2005/0034118 | A1* | 2/2005 | Raman et al. ................. | 717/174 |
| 2006/0031295 | A1 | 2/2006 | Goodman et al. | |
| 2006/0075001 | A1* | 4/2006 | Canning et al. .............. | 707/203 |
| 2006/0206818 | A1 | 9/2006 | Utter et al. | |
| 2007/0083589 | A1 | 4/2007 | Olsen | |
| 2007/0150812 | A1 | 6/2007 | Hu | |
| 2007/0157107 | A1 | 7/2007 | Bishop | |
| 2007/0192700 | A1* | 8/2007 | Sengar .......................... | 715/733 |
| 2007/0239760 | A1 | 10/2007 | Simon | |
| 2007/0250483 | A1 | 10/2007 | Blue et al. | |
| 2008/0040495 | A1* | 2/2008 | Adams et al. ................. | 709/230 |

(Continued)

OTHER PUBLICATIONS

Anon., "MonitoringForge.org Reaches 1,000 Registrants After First Week in Beta, Opens Community Documentation for Better Monitoring Practices," Business Wire, Sep. 30, 2009.*

*Primary Examiner* — Nicholas D Rosen
(74) *Attorney, Agent, or Firm* — Sony Corporation (57) ABSTRACT

A method and system for providing computer application support. The method comprises determining a set of installed applications on a source computer using a software manager module executing on a computer, generating a set of usage information for the set of installed applications on the one or more source computers, deriving a set of analysis results from the usage information using a software analysis module executing on a computer, generating a list of applications from the set of analysis results using the software analysis module, and providing the list to a destination computer.

19 Claims, 7 Drawing Sheets

(56) References Cited

U.S. PATENT DOCUMENTS

| | | | |
|---|---|---|---|
| 2008/0040714 A1* | 2/2008 | Wheeler et al. | 717/174 |
| 2008/0104065 A1 | 5/2008 | Agarwal et al. | |
| 2008/0250254 A1* | 10/2008 | Bendapudi et al. | 713/300 |
| 2008/0250323 A1* | 10/2008 | Huff | 715/733 |
| 2009/0164475 A1 | 6/2009 | Pottenger | |
| 2009/0265702 A1* | 10/2009 | Lu et al. | 717/174 |
| 2010/0287033 A1* | 11/2010 | Mathur | 705/10 |
| 2011/0131589 A1* | 6/2011 | Beaty et al. | 719/318 |

\* cited by examiner

METHOD AND SYSTEM FOR PROVIDING COMPUTER APPLICATION SUPPORT

BACKGROUND

1. Field of the Invention

Embodiments of the present invention generally relate to software management and, more particularly, to a method and system for recommending computer software applications.

2. Description of the Related Art

With advent of computers, applications (e.g., a software program) have also evolved over time. The applications act as an interface between a user and the computer and facilitate operation of the computer to perform various tasks. Such applications not only facilitate normal computer operation but also enable the user to perform various operations.

Users are often confronted with a wide array of choices for software applications for performing various tasks. For any given task, a user may need to choose from commercial, free open source, and pre-installed options. A review of the features offered by each option may be insufficient to fully advise the user on the capabilities of each application. Marketing and platform restrictions may further obfuscate the selection process, and result in a user selecting a sub-optimal application for the task at hand.

Furthermore, once the user has selected a software application, they may be unaware of various advanced features of the product. They may be unable to perform certain tasks, and may need to navigate confusing product manuals or consult customer service for assistance. This results in wasted time and lost productivity.

Accordingly, there exists a need for a method and system for providing application support to the user.

SUMMARY OF THE INVENTION

Embodiments of the present disclosure generally include a method and system for providing computer application support. In some embodiments, the method comprises determining a set of installed applications on a source computer using a software manager module executing on a computer, generating a set of usage information for the set of installed applications on the one or more source computers, deriving a set of analysis results from the usage information using a software analysis module executing on a computer, generating a list of applications from the set of analysis results using the software analysis module, and providing the list to a destination computer.

In some embodiments, the system comprises a software manager module executing on a local computer and a software analysis module executing on a remote computer. The software manager module is configured to generate information associated with at least one application installed on at least one source computer. The software analysis module is configured to configured to derive a set of analysis results derived from the information associated with the at least one application.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
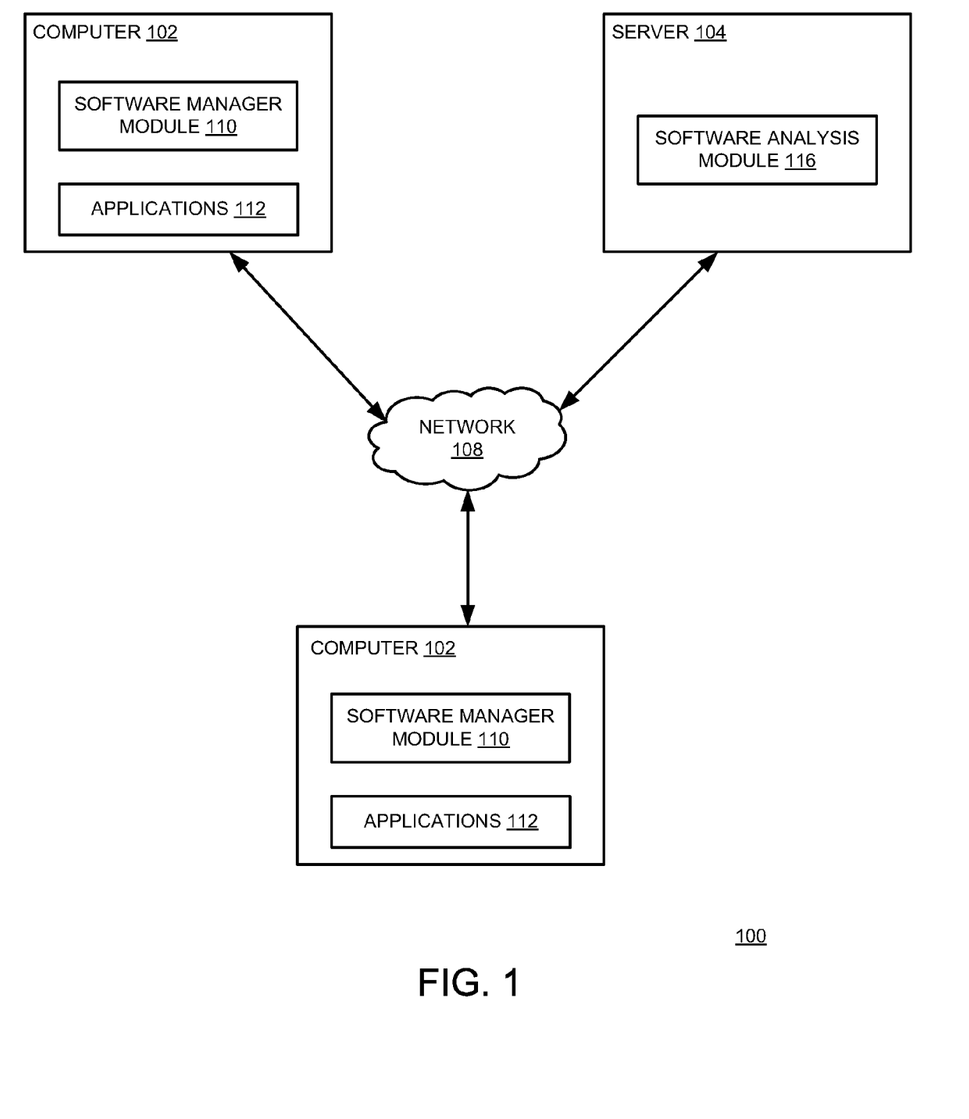
FIG. 1 is a block diagram of a system for providing computer application support, in accordance with embodiments of the present invention.

FIG. 1 is a block diagram of a system 100 for providing computer application support in accordance with embodiments of the present invention. The system 100 includes one or more computers 102, and a server 104, where each is coupled to one another through a network 108.

The one or more computers 102 are a type of computing device (e.g., a laptop computer, a desktop computer, a Personal Digital Assistant (PDA) and the like) as known to one of ordinary skill in the art. Applications 112 are computer software as generally known in the art and comprise software executed on the computer 102 to perform various functions. Specific non-limiting types of applications include word processors, spreadsheets, device drivers, operating systems, multimedia viewers and editors, games, and any other software executed on a computer to perform a task. The source computer 102 comprises a software manager 110 and one or more applications 112. The computer 102 communicates data to the server 104 related to the one or more applications 112. In some embodiments, the data communicated to the server 104 includes application type, version, usage information, and various other application metrics.

In some embodiments, the software manager module 110 aggregates information associated with usage of the each such application 112 and/or the application 114 as discussed further below. The aggregated data is then sent to the server 104 for analysis.

The server 104 is another computing device as known to one of ordinary skill in the art. In some embodiments, the server 104 may be a web server that provides web based services. In some embodiments, the server 104 communicates directly with the software manager module 110 without using a web interface. In some embodiments, the server 104 provides analysis services on data received from the one or more computers 102. The operation of the server is discussed further with respect to FIG. 3 and FIG. 4.

Figure 2:
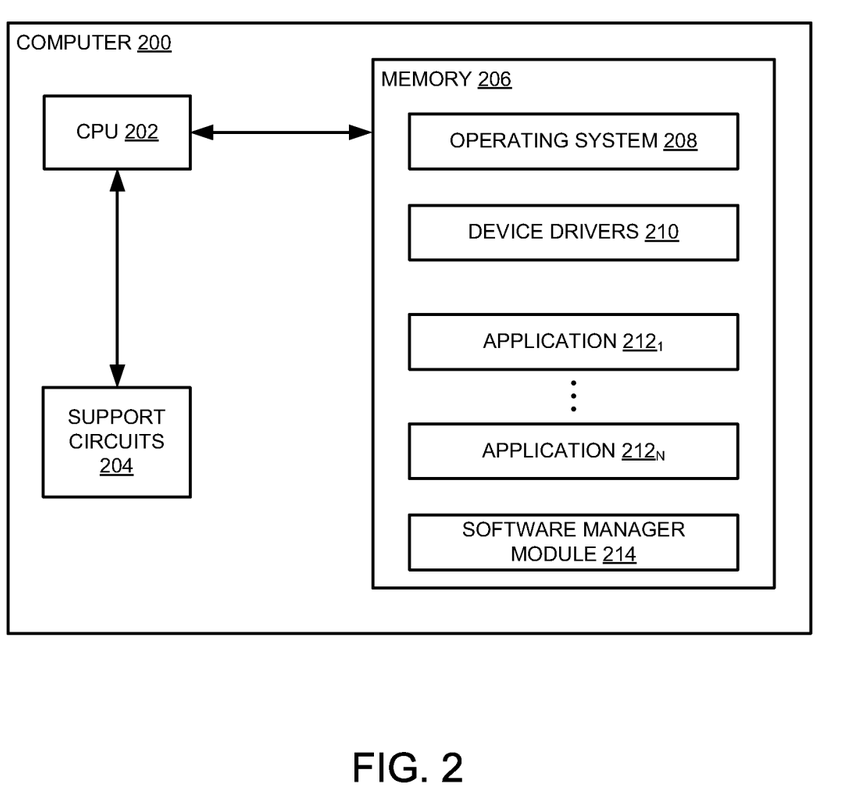
FIG. 2 is a block diagram of a computer, in accordance with embodiments of the present invention.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet or an intranet using various communications infrastructure such as Ethernet, WiFi, WiMax, General Packet Radio Service (GPRS), and the like. The server 104 communicates with the one or more computers 102 via the network 108. FIG. 2 is a block diagram of a computer 102 in accordance with embodiments of the present invention. As discussed above with respect to FIG. 1, the computer 102 is a type of computing device (e.g., a laptop, a desktop, a Personal Digital Assistant (PDA) and/or the like) as generally known in the art. The computer 102 comprises a Central Processing Unit (CPU) 202, various support circuits 204 and a memory 206. The CPU 202 may comprise one or more commercially available microprocessors or microcontrollers that facilitate data processing and storage. Various support circuits 204 facilitate operation of the CPU 202 and may include clock circuits, buses, power supplies, input/output circuits and/or the like. The memory 206 includes a read only memory, random access memory, disk drive storage, optical storage, removable storage, and the like. The memory 206 includes an operating system 208, device drivers 210, various applications 212 (illustrated as an application $212_1, \ldots$, an application $212_N$) and a software manager module 214.

The operating system 208 generally manages various computer resources (e.g., network resources, data storage resources, file system resources and/or the like). The operating system 208 is configured to execute operations on one or more hardware and/or software devices, such as Network Interface Cards (NICs), hard disks, virtualization layers, firewalls and/or the like. For example, the various software packages call commands associated with the operating system 208 (i.e., native operating system commands) to perform various file system and/or storage operations, such as creating files or metadata, writing data to the files, reading data from the files, modifying metadata associated with the files and/or the like. The operating system 208 may call one or more functions associated with the device drivers 210 to execute various file system and/or storage operations. As an example, the operating system 208 may utilize a device driver associated with a Network Interface Card (NIC) card to communicate data to another computer as explained further below.

According to some embodiments of the present invention, the applications 212 (illustrated as an application $212_1, \ldots$, an application $212_N$) comprise software programs such as MS Word, MS Excel, MS PowerPoint, ADOBE Acrobat Reader and/or the like. Such applications 212 facilitate a user of the computer 200 to perform various operations. As the user utilizes the application 212 a usage pattern for each application 212 is monitored by the software manager module 214.

In some embodiments, the software manager module 214 includes software code (i.e. processor executable instruction) that, when executed by the CPU 202, monitors the usage of the applications 212. In some embodiments, the software manager module 214 generates statistics comprising information associated with usage of the each such application 212.

Many applications 212 register certain information with the operating system 208 upon installation, providing information such as the application name, version, release number, publisher name, and the like. In some embodiments, the software manager module 214 receives this descriptive information directly from the operating system 208. In some embodiments, the software manager module 214 determines the presence of the applications 212 by examining the file names of the application located on a storage volume. In some embodiments, the software manager module 214 monitors the processes executing on the CPU 202 to determine the identity of the applications 212. In some embodiments, the software manager module 214 determines a file checksum or hash value for a given file and compares the checksum or hash with a known set of applications. The software manager module 214 may compare data obtained from the local computer (e.g. a file name, a checksum, a process name, and the like) with a local table identifying various applications. In some embodiments, the software manager module 214 may send identifying information to a remote server, such as the server 104 discussed with respect to FIG. 1, to determine the identity of installed applications. In some embodiments, the software manager module 214 monitors the programs that are running on a system using a separate application provided for this purpose, such as via the WINDOWS task manager. The software manager module 214 may contain a table of process names for performing a lookup of associated applications.

In some embodiments, the information includes a frequency of the usage of the application 212. For example, one or more applications 212 may be frequently used while certain other applications 212 may be seldom used. As such, the frequency of the usage of the each application 212 may be included in the application statistics. Usage frequency may be determined in a similar manner to application identity. One of ordinary skill in the art would recognize multiple ways of monitoring application usage, including monitoring running processes, receiving usage information from the operating system 208, and the like. In some embodiments, the software manager module 214 may track key strokes, mouse clicks, and/or other user interface operations performed within a given application. In some embodiments, the software manager module 214 may interface with a set of drivers and services that monitor OS activities. In some embodiments, the software manager module 214 tracks the usage of web applications accessed via a web browser (such as HTML 5 applications planned for the GOOGLE CHROME OS).

Once the application statistics are generated, the software manager module 214 communicates the statistics to a server (e.g., the server 104 of FIG. 1) for further analysis as discussed further below with respect to FIGS. 3 and 4. Based on the analysis provided by the server, the software manager module 214 may provide recommendations to the user to install one or more alternate applications 212 on the computer 200. In some embodiments, the user may select the one or more applications 212 for installation on the computer 200 using an interface provided by the software manager module 214. In some embodiments, the software manager module 214 provides an interface for the user to purchase the alternate applications 212. In some embodiments, the user may select to install a trial version of the alternate application 212. Additionally, the software manager module 214 may facilitate the user to renew and/or procure a license for the alternate application 212 and/or the trial version supplied by the software manager module 214.

In some embodiments, the software manager module 214 facilitates the user of the computer 200 (e.g., the computer 106 of FIG. 1) to designate one or more other users as friends and/or add already existing friends from a social networking web site such as FACEBOOK, ORKUT, TWITTER, MYSPACE and/or various other social networking applications. These friends settings may then be used to facilitate application support and to provide suggestions for alternate applications. This process is discussed further with respect to FIG. 6.

Figure 3:
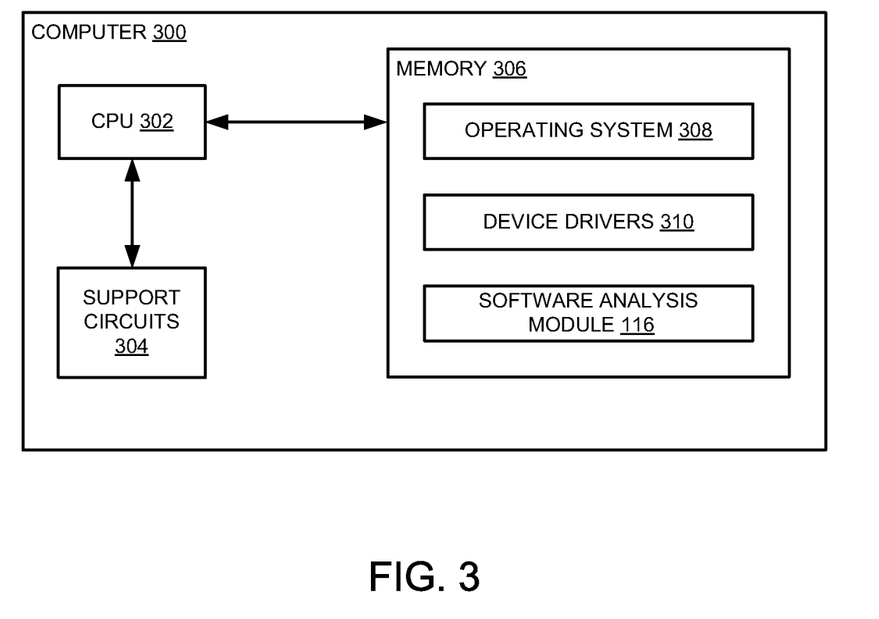
FIG. 3 is a block diagram of a server for providing computer application support, in accordance with embodiments of the present invention.

FIG. 3 is a block diagram of a server 300 for recommending providing computer application support according to embodiments of the present invention. In some embodiments, the server 300 is a web server that provides web based services. The server 300 provides analysis services as discussed further below.

The server 300 is a computing device (e.g., a laptop, a desktop, a Personal Digital Assistant (PDA) and/or the like) that comprises a Central Processing Unit (CPU) 302, various support circuits 304 and a memory 306. The CPU 302 comprises one or more commercially available microprocessors or microcontrollers that facilitate data processing and storage. The support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308, device drivers 310 and a software analysis module 312.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a Network Interface Card (NIC) card to communicate data to another computer as explained further below.

The server 300 includes a software analysis module 312. The analysis module 312 receives application information from the one or more computers 102. The analysis module 312 then processes this information to determine various statistics about the applications 112 such as usage frequency, application type, and purpose. The analysis module 312 performs statistical analysis to determine which applications are used most frequently to perform particular functions. In some embodiments, the software analysis module 312 tracks which applications are most frequently used. The software analysis module 312 may correlate these applications to a particular task. This correlation data may be provided to the computers 102 to recommend particular applications for particular tasks.

In some embodiments, the server 300 may also provide an interface to install the recommended applications on the computers 102. In some embodiments, the server 104 may provide an interface to purchase and download the recommended applications to the computers 102. In some embodiments, the server 104 may also provide account and content management services, such as allowing a user to view usage statistics of specific other users, filter analysis based on specific usage profiles, and the like.

The software analysis module 312 includes software code (e.g., processor executable instructions) that, when executed by the CPU 302, causes the software analysis module 312 to process the information. In one embodiment, the software analysis module 312 performs a statistical analysis on the application information to determine a set of analysis results, comprising various metrics. The set of analysis results may include a usage pattern of the one or more applications by their respective users. For example, the set of metrics may indicate that a particular application is utilized by sixty seven (67) users out of eighty seven (87) users, or that a particular word processing application is installed and used far more often than another particular word processing application.

Based on the set of analysis results, the software analysis module 312 provides suggestions (i.e. recommendations) to the computers 102 commonly used to perform similar tasks to those performed by applications currently installed on the computer 102. For example, the suggestions may indicate that the majority of users who perform photo editing tasks use PHOTOSHOP, published by ADOBE, or that most users use MICROSOFT WORD for word processing. In some embodiments, the suggestions 316 are created in response to particular filters provided by the user of the computer 102. For example, in some embodiments, the user may wish to create the suggestions 316 with a filter that only analysis results 314 from users designated as "friends" via a social networking application are considered. In this manner, the suggestions 316 are determined only from the applications used by friends of the user. While the use of a "friends" filter is discussed as a specific, non-limiting example, one of ordinary skill in the art would recognize the application of similar principles to filters based on various user demographics such as age, location, level of technical ability, education, membership in specific social groups, and the like.

In some embodiments, the software analysis module 312 may publish a knowledge base associated with most frequently and/or popularly asked queries for particular software applications. The instant invention advantageously provides a single interface for technical support for each application present on the computer 102. The social networking aspects of the instant invention advantageously allow the user to contact other users who are using the application with queries about the application or for help with the application. Furthermore, the server 300 may also provide an interface for software developers and publishers to maintain technical support knowledge bases relating to their particular software applications. The server 300 thus facilitates the support process by providing a single interface for support for the multiple applications present on the computer 102.

Figure 4:
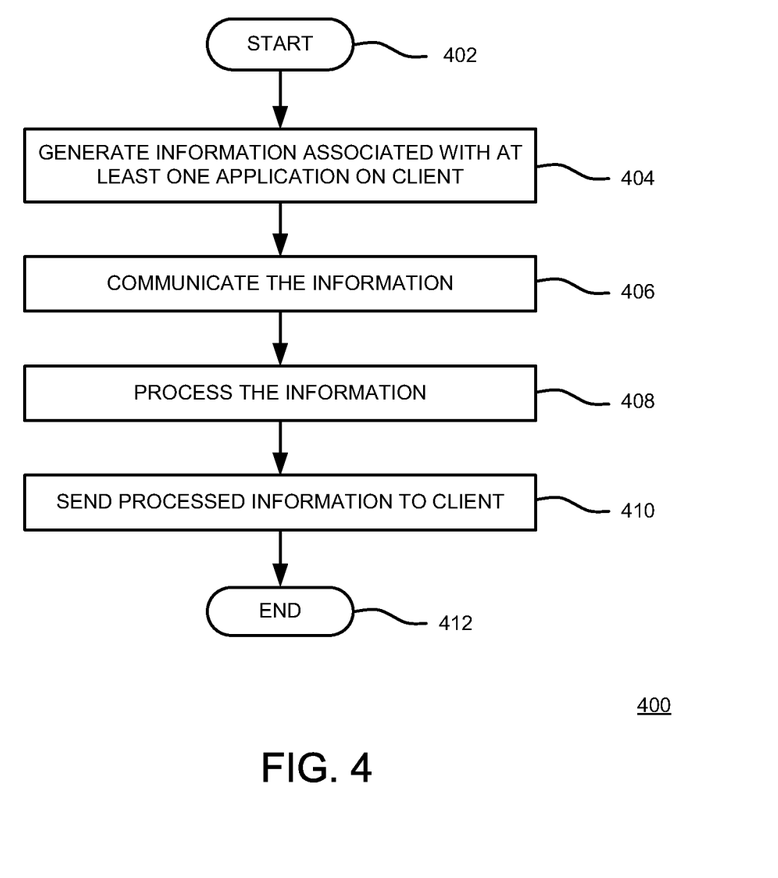
FIG. 4 is a flow diagram of a method for providing computer application support, in accordance with embodiments of the present invention.

FIG. 4 is a flow diagram of a method 400 for providing application support according to embodiments of the present invention. The method 400 starts at step 402 and proceeds to step 404, where a software manager module 112 generates information describing the applications installed on a computer 102. In some embodiments, this information may also comprise application version information, usage statistics, application type, and the like. This information is used by the software analysis module 116 to determine the usage patterns of applications installed on the computer 102.

At step 406, the software manager module 112 communicates the information to a remote software analysis module 116. The software analysis module 116 aggregates information provided from multiple software manager module applications installed on multiple computers 102. In some embodiments, the software analysis module 116 determines which applications are most popular by type, categorizing the applications by which are used most often to perform particular tasks. In some embodiments, the software analysis module 116 associates provided information with a particular user, for the purpose of allowing a user to select only data provided by the particular user or a particular subset of all users.

At step 408, the software analysis module 116 processes the aggregated information. In some embodiments, this processing step may include analysis of which applications are most often used for certain tasks by determining which applications are most commonly installed, and which applications are most frequently used. In some embodiments, the software analysis module 116 generates a list of commonly used applications.

At step 410, the software analysis module 116 provides the processed and analyzed information to the client computer 102. In some embodiments, the information is provided as a web page with interactive components. In some embodiments, the list includes an interface allowing for purchase and/or installation of certain applications. In some embodiments, the list may include one or more links to user discussion and/or technical support for installed applications.

Figure 5:
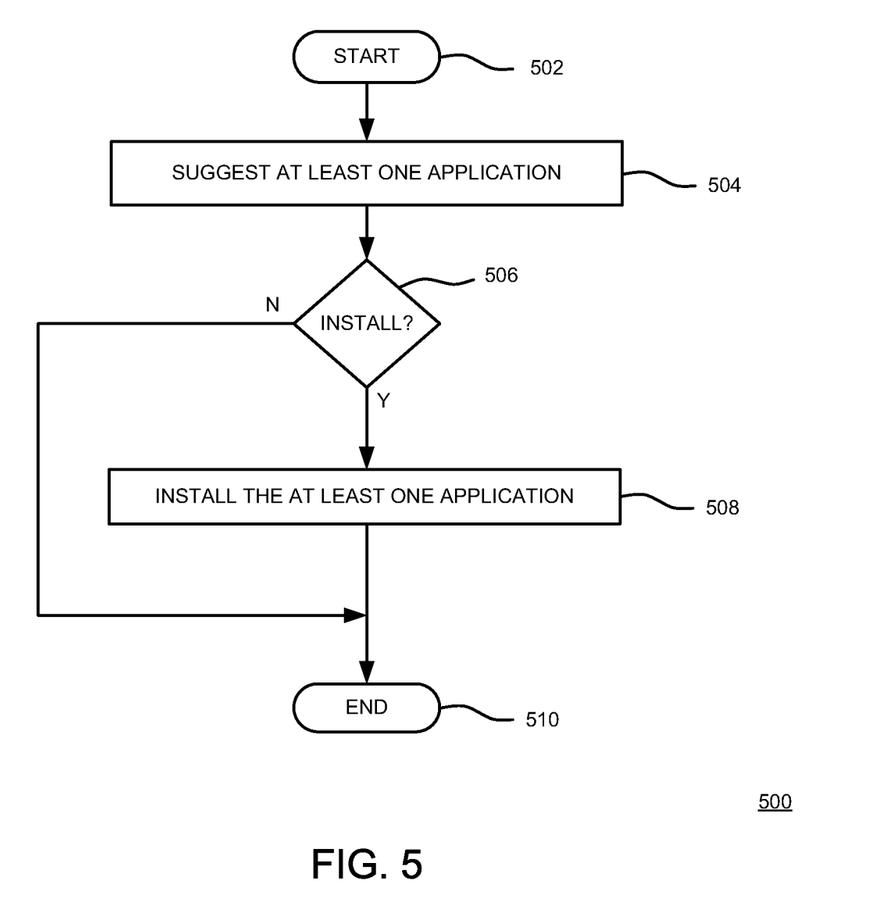
FIG. 5 is a flow diagram of a method for installing at least one application on a computer, in accordance with embodiments of the present invention.

FIG. 5 is a flow diagram of a method 500 for installing at least one application on a computer according to some embodiments of the present invention. The method 500 starts at step 502 and proceeds to step 504, where the software analysis module 116 provides an interface suggesting one or more applications to a computer 102. In some embodiments, the suggestions are derived from processing and analyzing software usage patterns as discussed with respect to FIG. 4.

At step 506, the interface prompts a user to install the suggested application. If the user responds affirmatively to the prompt, (option "YES") then the method 500 proceeds to step 508. At step 510, the one software manager module 112 proceeds to download and install the selected application on the computer. In some embodiments, the installation process may include an option for the user to purchase access to the application prior to download. One of ordinary skill in the art would recognize methods by which a user might purchase an application for download. The method 500 then ends at step 512.

If at step 506, it is determined that the user does not want to install the one or more application (option "NO") then the method 500 ends at step 512.

Figure 6:
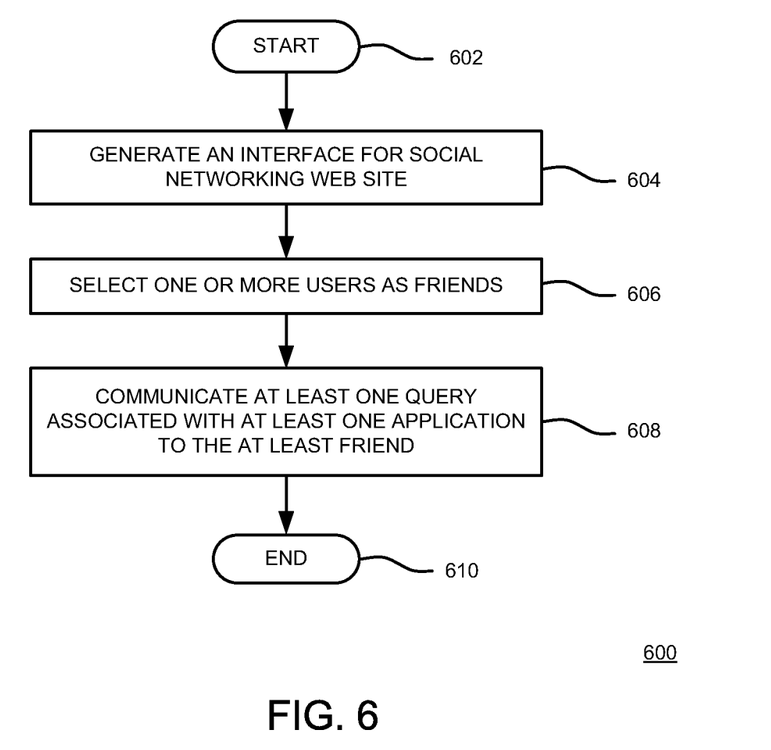
FIG. 6 is a flow diagram of a method for providing an interface to a social networking web site, in accordance with one or more embodiments of the present invention.

FIG. 6 is a flow diagram of a method 600 for providing an interface for a social networking web site according to one or more embodiments of the present invention.

The method 600 starts at step 602 and proceeds to step 604, at which an interface for social networking web site is generated. The software manager module 112 interfaces with one or more social networking sites, allowing a user to access a set of friends and/or contacts as provided by the social networking site. At step 606, the user selects one or more friends from the social networking interface. In some embodiments, the interface may provide information on which friends have particular applications installed. In some embodiments, the interface may allow the user to select a particular application, and display all friends who have that particular application installed. In some embodiments, the software manager module 112 may also display various technical support options in addition to a friends list. In some embodiments, the software manager module 112 may include an interface for accessing a frequently asked questions menu.

In some embodiments, the software manager module 112 is configured to interface with the social networking web sites. In some embodiments, the software manager In some embodiments, the software manager module 214 is configured to provision a chat window that enables the user of the computer 200 to forward the one or more queries to the friends. Such forwarding of the one or more queries to the friends facilitates the user of the computer 102 to direct the one or more queries to the friend that possess knowledge to operate the application 112 associated with the query. By providing an interface to quickly allow a user to determine which friends and contacts have experience operating the particular application, the user may avoid traditional avenues of technical support, saving time and money.

In some embodiments, the software manager module 112 enables a user to designate other users as friends. In some embodiments, the software manager module 112 communicates with the social networking site via the server 104. In some embodiments, the software manager module 112 communicates with the social networking site directly.

The method 600 proceeds to step 608, where the user submits a query via the software manager module 112. The query is sent to the selected friends and/or contacts. In some embodiments, the query is received via the social networking site. In some embodiments, the communication appears in a remote software manager module located on the friend's computer 102. In some embodiments, the server 104 receives the query and forwards the query to the appropriate destination.

Figure 7:
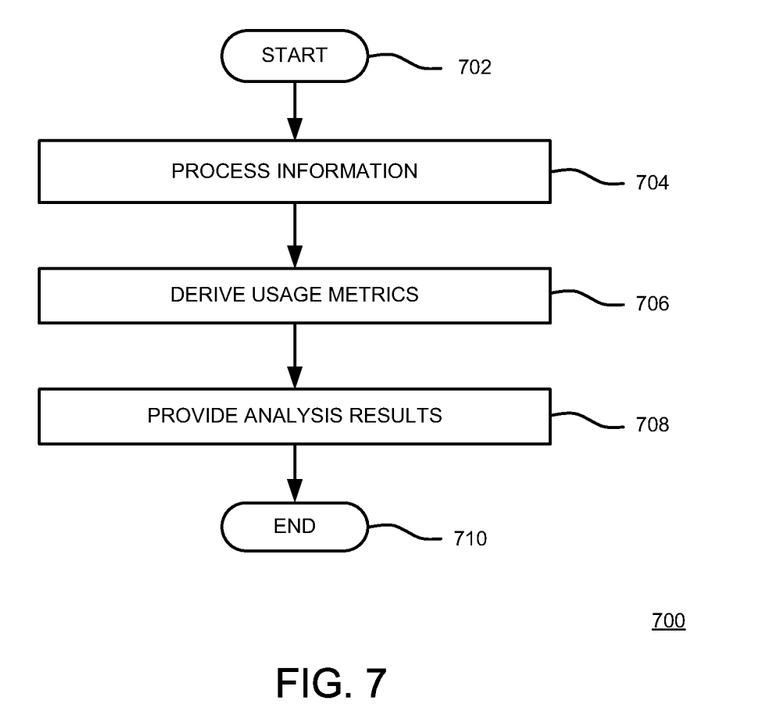
FIG. 7 is a flow diagram of a method for publishing a list of applications in accordance with embodiments of the present invention.

FIG. 7 is a flow diagram of a method 700 for publishing a list of applications according to embodiments of the present invention.

The method 700 starts at step 702. At step 704, the software analysis module 116 processes information received from one or more software manager modules 112. At step 706, the software analysis module 116 derives a set of analysis results from the processed information. At step 708, the software analysis module makes the set of analysis results available to the one or more software manager modules 112. In some embodiments, the software analysis module 116 provides a set of usage data to be processed by the software manager module 112. In some embodiments, the software analysis module 116 provides the analysis results as a set of recommended applications. In some embodiments, the list includes a knowledge base associated with one or more applications. In some embodiments, the analysis results comprise a document that includes most frequently and/or popularly asked queries associated with the one or more applications.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for providing computer application support comprising:
   in a computing device with a network interface:
      determining a set of installed applications on a source computer using a software manager module executing on one or more source computers, wherein each of the set of installed applications is configured to perform a corresponding specific task among a plurality of specific tasks;
      generating a set of usage information for the set of installed applications on the source computer by monitoring operating system activities of the source computer;
      deriving a set of analysis results from the set of usage information using a software analysis module executing on the computing device, wherein the set of analysis results comprises a respective usage pattern of the each of the set of installed applications;
      generating, for each of the plurality of specific tasks, a list of applications based on the respective usage pattern; and transmitting the list of applications from the set of analysis results to a destination computer via the network interface.

2. The method of claim 1, further comprising providing an interface for a social networking application for the set of installed applications on the one or more source computers.

3. The method of claim 2, further comprising deriving the set of analysis results from usage information provided by one or more users of the social networking application.

4. The method of claim 2, further comprising submitting a support query associated with a particular software application to one or more users of the social networking application, wherein the one or more users of the social networking application have submitted usage information indicating that they use the particular software application.

5. The method of claim 2, further comprising providing a technical support knowledge base for the set of installed applications.

6. The method of claim 1, further comprising providing an interface to install an application from the list of applications.

7. The method of claim 1, further comprising providing an interface to purchase an application from the list of applications.

8. The method of claim 1, wherein the set of installed applications is determined from one or more of: application file names, application file checksums, operating system process information tables, or operating system configuration settings.

9. The method of claim 1, wherein the set of usage information comprises one or more of: a number of times an application has been executed, a duration of time the application has run, or a number of operations performed with the application.

10. The method of claim 1, further comprising filtering the set of analysis results based on user defined filter criteria.

11. A system for providing computer application support, comprising:
in a network comprising a plurality of source computers interconnected to a computing device:
a processor in the computing device operable to:
generate information associated with at least one application installed on at least one source computer among the plurality of source computers; and
derive a set of analysis results from the information associated with the at least one application, wherein the set of analysis results is derived by determining a respective usage pattern of the at least one application installed on by monitoring operating system activities of the at least one source computer; and
display a social networking interface for selection of one or more particular users to filter the set of analysis results.

12. The system of claim 11, wherein the processor is operable to generate a list of one or more suggested applications to be installed on the at least one source computer based on the derived set of analysis results.

13. The system of claim 11, wherein the computing device is operable to communicate at least one support query associated with a particular installed application to a server computer.

14. A non-transitory computer-readable storage medium having stored thereon, a set of computer executable instructions for causing a computer to perform steps comprising:
determining a set of installed applications on a computer, wherein each of the set of installed applications is configured to perform a corresponding specific task among a plurality of specific tasks;
determining a set of usage information for the set of installed applications by monitoring operating system activities of the computer;
sending the set of installed applications and the set of usage information to a remote computer for generating a set of analysis results, wherein the set of analysis results comprises a respective usage pattern of the each of the set of installed applications; and
receiving, for each of the plurality of specific tasks, a list of suggested applications derived based on the respective usage pattern from the remote computer.

15. The non-transitory computer readable storage medium of claim 14, further comprising providing a social networking interface for filtering the set of analysis results to be calculated from particular users.

16. The non-transitory computer readable storage medium of claim 14, further comprising providing an interface for installing one or more applications listed in the set of analysis results.

17. The non-transitory computer readable storage medium of claim 15, further comprising providing an interface for purchasing the one or more listed applications.

18. The non-transitory computer readable storage medium of claim 14 wherein the set of installed applications is determined from one or more of: application file names, application file checksums, operating system process information tables, or operating system configuration settings.

19. The non-transitory computer readable storage medium of claim 14, wherein the set of usage information comprises one or more of: a number of times an application has been executed, a duration of time the application has run, or a number of operations performed with the application.

* * * * *